US010915844B2

(12) United States Patent
Geroulo et al.

(10) Patent No.: US 10,915,844 B2
(45) Date of Patent: Feb. 9, 2021

(54) VALIDATION OF SUPPLY CHAIN DATA STRUCTURES

(71) Applicant: International Business Machines Corporation, Armonk, NY (US)

(72) Inventors: Michael T. Geroulo, Plattsburgh, NY (US); Thomas R. Ervolina, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 15/854,363

(22) Filed: Dec. 26, 2017

(65) Prior Publication Data
US 2019/0197449 A1    Jun. 27, 2019

(51) Int. Cl.
*G06Q 10/00* (2012.01)
*G06Q 10/06* (2012.01)
(Continued)

(52) U.S. Cl.
CPC ..... *G06Q 10/06315* (2013.01); *G05B 19/418* (2013.01); *G05B 19/41865* (2013.01);
(Continued)

(58) Field of Classification Search
None
See application file for complete search history.

(56) References Cited

U.S. PATENT DOCUMENTS 5,608,620 A * 3/1997 Lundgren ........ G06Q 10/06398
705/1.1
5,953,707 A * 9/1999 Huang .................. G06Q 10/06
705/7.25
(Continued)

OTHER PUBLICATIONS

Mohebbi, S., et al., "Designing intelligent agents to support long-term partnership in two echelon e-supply networks"; Expert Systems with Applications, pp. 13501-13508; Dec. 15, 2012, vol. 39, No. 18.
(Continued)

*Primary Examiner* — Gurkanwaljit Singh
(74) *Attorney, Agent, or Firm* — Scully, Scott, Murphy & Presser, P.C.; Daniel P. Morris (57) ABSTRACT

Systematically and comprehensively identifying and evaluating structure changes in MRP runs. A multi-step process employs a crawler analytic to: transform dated structure inputs to time based patterns which represent effectivity windows within the plan horizon for child parts on BOM or interplant records; employ a multi-stage multi dimensional recursive optimizing pattern matcher method to associate effectivity window patterns, within the current cycle MRP input space, across a sequential series of MRP cycles, and across like entities, into transition sets which likely represent shifts in BOM content and/or interplant relationships; tie changes to top level demand drivers and effected component items; rationalize in and cross cycle, cross location, structure differences with trends in component and driver demand to identify candidate soft spots in part and/or relationship changes which can negatively impact the exploded demand result; distill the analysis to a consumable view which visually renders the problem and impact.

20 Claims, 11 Drawing Sheets

(51) Int. Cl.
*G06Q 10/08* (2012.01)
*G06F 16/951* (2019.01)
*G05B 19/418* (2006.01)
*G06N 3/08* (2006.01)
*G06N 7/00* (2006.01)
*G06N 20/00* (2019.01)

(52) U.S. Cl.
CPC ..... *G06F 16/951* (2019.01); *G06Q 10/06375* (2013.01); *G06Q 10/06393* (2013.01); *G06Q 10/087* (2013.01); *G06Q 10/0875* (2013.01); *G06N 3/08* (2013.01); *G06N 7/005* (2013.01); *G06N 20/00* (2019.01)

(56) References Cited

U.S. PATENT DOCUMENTS

| | | | | |
|---|---|---|---|---|
| 5,963,919 A * | 10/1999 | Brinkley | ............. | G06Q 10/087 705/22 |
| 6,606,615 B1 * | 8/2003 | Jennings | ............. | G06Q 10/06 706/45 |
| 6,658,467 B1 * | 12/2003 | Rice | ............. | G06Q 30/02 709/219 |
| 6,792,399 B1 * | 9/2004 | Phillips | ............. | G06Q 10/06 705/36 R |
| 6,865,542 B2 * | 3/2005 | Cox | ............. | G06Q 10/06315 705/7.31 |
| 7,072,863 B1 * | 7/2006 | Phillips | ............. | G06Q 40/00 703/2 |
| 7,124,101 B1 * | 10/2006 | Mikurak | ............. | G06Q 10/06 705/35 |
| 7,225,153 B2 * | 5/2007 | Lange | ............. | G06Q 40/00 705/35 |
| 7,499,766 B2 * | 3/2009 | Knight | ............. | G06Q 10/087 700/107 |
| 7,584,116 B2 * | 9/2009 | Kakouros | ............. | G06Q 30/0202 705/7.31 |
| 7,590,937 B2 * | 9/2009 | Jacobus | ............. | G06Q 40/06 715/700 |
| 7,672,921 B1 * | 3/2010 | Clay | ............. | G06Q 10/06 706/45 |
| 7,716,077 B1 * | 5/2010 | Mikurak | ............. | G06Q 10/06 705/7.12 |
| 7,747,339 B2 * | 6/2010 | Jacobus | ............. | G06Q 40/06 700/99 |
| 8,781,882 B1 * | 7/2014 | Arboletti | ............. | G06Q 10/0639 705/7.39 |
| 9,495,652 B1 * | 11/2016 | Cook | ............. | G06Q 10/06313 |
| 2002/0072977 A1 * | 6/2002 | Hoblit | ............. | G06Q 20/203 705/22 |
| 2002/0133368 A1 * | 9/2002 | Strutt | ............. | G06Q 30/02 705/7.11 |
| 2002/0138316 A1 * | 9/2002 | Katz | ............. | G06Q 30/0202 705/7.13 |
| 2002/0152111 A1 * | 10/2002 | Cox | ............. | G06Q 10/0637 705/7.31 |
| 2002/0174000 A1 * | 11/2002 | Katz | ............. | G06Q 10/087 705/7.26 |
| 2002/0178077 A1 * | 11/2002 | Katz | ............. | G06Q 10/10 705/7.36 |
| 2003/0028420 A1 * | 2/2003 | DeBiasse | ............. | G06Q 10/06311 705/7.13 |
| 2004/0064351 A1 * | 4/2004 | Mikurak | ............. | G06Q 10/087 705/22 |
| 2004/0068454 A1 * | 4/2004 | Jacobus | ............. | G06Q 40/06 705/36 R |
| 2004/0068455 A1 * | 4/2004 | Jacobus | ............. | G06Q 10/087 705/36 R |
| 2004/0088211 A1 * | 5/2004 | Kakouros | ............. | G06Q 10/06395 705/7.31 |
| 2005/0209732 A1 * | 9/2005 | Audimoolam | ............. | G06Q 20/203 700/216 |
| 2006/0178918 A1 * | 8/2006 | Mikurak | ............. | G06Q 10/06375 705/7.25 |
| 2007/0067307 A1 | 3/2007 | LePoutre et al. | | |
| 2008/0133960 A1 | 6/2008 | Wong et al. | | |
| 2008/0285847 A1 | 11/2008 | Panwar et al. | | |
| 2009/0125373 A1 | 5/2009 | Lukes et al. | | |
| 2009/0172035 A1 * | 7/2009 | Lessing | ............. | G06Q 30/02 |
| 2014/0019471 A1 * | 1/2014 | Linton | ............. | G06F 16/242 707/759 |

OTHER PUBLICATIONS

Baumgartel, P., et al., "Towards Data and Data Quality Management for Large Scale Healthcare Simulations: Position Paper", Proceedings of the International Conference on Health Informatics, HEALTHINF 2012, Feb. 1, 2012-Feb. 4, 2012, pp. 275-280.

Anonymously, "A technique to allow consumers to quickly determine the legitimacy of a single or a group of items purchased through POS or Online ordering systems", http://ip.com/IPCOM/000235864, Mar. 28, 2014, 5 pages.

Anonymously, "Enhanced Services for Manufacturers & Partners: Supply Chain Management Tools Offering Visibility,Tracking, and Payment Services", http://ip.com/IPCOM/000191159, Dec. 18, 2009, 14 pages.

Anonymously, "High Performance Computing based system for optimization and analyses in the LNG business", http://ip.com/IPCOM/000234153, Jan. 14, 2014, 9 pages.

* cited by examiner

| parent | child | start date | end date | usage rate quantity per |
|---|---|---|---|---|
| 23R8852 | 84Y3203 | 20101025 | 20101122 | 1.0 |
| 23R8852 | 16H4401 | PAST | FUTURE | 1.0 |
| 23R8852 | 77G3162 | 20101027 | FUTURE | 2.0 |
| 23R8852 | 77G3352 | 20100101 | 20100815 | 1.0 |
| 23R8852 | 45D8801 | 20101025 | 20101213 | -1.0 |
| 23R8852 | 45J7543 | 20101129 | 20101222 | 0.5 |
| 23R8852 | 16R0301 | 20101122 | 20101222 | 1.0 |
| 23R8852 | 17R0301 | 20101222 | 20101227 | 10.0 |
| 23R8852 | H886602 | 20101129 | FUTURE | 125.0 |

FIG. 1

| parent | child | start date | end date | usage rate quantity per |
|---|---|---|---|---|
| 23R8852 | 84Y3203 | 20101025 | 20101122 | 1.0 |
| 23R8852 | 16H4401 | PAST | FUTURE | 1.0 |
| 23R8852 | 77G3162 | 20101027 | FUTURE | 2.0 |
| 23R8852 | 77G3352 | 20100101 | 20100815 | 1.0 |
| 23R8852 | 45D8801 | 20101025 | 20101213 | -1.0 |
| 23R8852 | 45J7543 | 20101129 | 20101222 | 0.5 |
| 23R8852 | 16R0301 | 20101122 | 20101222 | 1.0 |
| 23R8852 | 17R0301 | 20101222 | 20101227 | 10.0 |
| 23R8852 | H886602 | 20101129 | FUTURE | 125.0 |

FIG. 2

| parent | child | start date | end date | footprint (assume 8 week horizon sample) |
|---|---|---|---|---|
| 23R8852 | 84Y3203 | 20101025 | 20101122 | 11100000 |
| 23R8852 | 16H4401 | PAST | FUTURE | |
| 23R8852 | 77G3162 | 20101027 | FUTURE | |
| 23R8852 | 77G3352 | 20100101 | 20100815 | |
| 23R8852 | 45D8801 | 20101025 | 20101213 | |
| 23R8852 | 45J7543 | 20101129 | 20101222 | |
| 23R8852 | 16R0301 | 20101122 | 20101222 | 00011110 |
| 23R8852 | 17R0301 | 20101222 | 20101227 | 00000001 |
| 23R8852 | H886602 | 20101129 | FUTURE | |

FIG. 3

| parent | child | start date | end date | footprint |
|--------|-------|------------|----------|-----------|
| 23R8852 | 84Y3203 | 20101025 | 20101122 | 11100000 |
| 23R8852 | 16H4401 | PAST | FUTURE | 11111111 |
| 23R8852 | 77G3162 | 20101027 | FUTURE | 11111111 |
| 23R8852 | 77G3352 | 20100101 | 20100815 | 00000000 |
| 23R8852 | 45D8801 | 20101025 | 20101213 | 11111100 |
| 23R8852 | 45J7543 | 20101129 | 20101222 | 00001110 |
| 23R8852 | 16R0301 | 20101122 | 20101222 | 00001110 |
| 23R8852 | 17R0301 | 20101222 | 20101227 | 00000001 |
| 23R8852 | H886602 | 20101129 | FUTURE | 00001111 |

VALIDATION OF SUPPLY CHAIN DATA STRUCTURES

FIELD

The present application relates generally to computers and computer applications, and more particularly to supply chain network and data structure.

BACKGROUND

Supply chain planning systems are very sensitive to data quality. Examples of supply planning systems include manufacturing resource planning or material requirements planning (MRP), Workstation Implosion Tool (WIT) from International Business Machines Corporation (IBM)™, International Business Machines Corporation (IBM)™ i2 analyze (i2), Systems Application and Products (SAP). Incorrect or poor quality input data often produces faulty output.

Supply Chains are becoming more complex and more dynamic: Globally integrated enterprise (GIE) may require increasing need to manage an end-to-end single central planning environment; Shorter product life cycles trigger more frequent product transitions; Outsourcing of supply chain means that the scope of the supply chain spans multi-enterprise supply network, the planning systems requiring data feeds from multiple sources; Increasing pace of planning cadence also means more frequent planning cycles.

Even without data quality issues, the results of these planning systems may exhibit problematic behavior due to the dynamics of the underlying business environment. Demand changes from cycle to cycle are common and expected and increasing complexity and dynamics leads to increasing data quality issues. Given the changing dynamics of the supply chain, a supply chain system more than before need to perform time consuming validation exercises, for instance, each time the system run a cycle, for example, perform MRP validation.

Supply chain systems striving to transform toward a smarter supply chain increasingly rely on advanced planning systems. At the operational level these systems may act as a giant black box, presenting barriers on the ability to validate and trust the results. Supply chain analysts may need to spend considerable time in validation of these engine results. The validation usually needs to be performed for every cycle. With increasing iterations and increasing complexity, barriers are encountered on the ability to transform the supply chain to leverage these planning systems. Furthermore, validation may require an expert skill set, which may be localized into specific product brands. Absence of such skill set may present a risk to validate planning systems. This effect experienced in supply chain systems may present a hurdle to broader adoption of advanced planning systems.

BRIEF SUMMARY

A system and method of transforming supply chain data structures that control or adjust a manufacturing process may be provided. The system, in one aspect, may include a hardware processor and a memory device coupled to the hardware processor. The hardware processor may receive a parts list comprising a list of components used in manufacturing products. The hardware processor may also extract, transform and load data structure and demand information associated with the list of components from a product database. The hardware processor may also feed the parts list and the data structure and demand information to a pattern analyzer executing on a hardware processor. The pattern analyzer may detect structure changes occurring within a manufacturing requirements planning base for multiple manufacturing requirements planning bases. The hardware processor may also feed the detected structure changes to a trend analyzer executing on the hardware processor. The trend analyzer may detect structure changes occurring across the multiple manufacturing requirements planning bases, and generate a business intelligence object providing a view of structure item behavior within and across the multiple manufacturing requirements planning bases. The business intelligence object may be fed to a manufacturing requirements system to control or adjust a manufacturing process.

A method of transforming supply chain data structures to control or adjust a manufacturing process, in one aspect, may include receiving a parts list comprising a list of components used in manufacturing products. The method may also include extracting, transforming and loading data structure and demand information associated with the list of components from a product database. The method may further include feeding the parts list and the data structure and demand information to a pattern analyzer executing on a hardware processor. The method may also include the pattern analyzer detecting structure changes occurring within a manufacturing requirements planning base for multiple manufacturing requirements planning bases. The method may also include feeding the detected structure changes to a trend analyzer executing on the hardware processor. The method may further include the trend analyzer detecting structure changes occurring across the multiple manufacturing requirements planning bases. The method may further include the trend analyzer generating a business intelligence object providing a view of structure item behavior within and across the multiple manufacturing requirements planning bases. The business intelligence object may be fed back automatically into a manufacturing requirements planning system, to automatically control or adjust a manufacturing process.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Material requirements planning (MRP) solutions operate on large input data sets which include but are not limited to demand, supply, structure, and parametric information, where the structure input includes both bill of material (BOM) data and cross business entity, also known as interplant, relationships. MRP execution transforms the demand input into material requirements by applying the structure and supply inputs to the demand. While demand and supply shifts are primary drivers of changes in exploded component demand (based on BOM items per product and product demand), shifts in BOM and interplant data can have profound impacts on the MRP result. Demand and supply shifts are easy to identify and quantify. But since input sets are typically large (e.g., hundreds of thousands of records) and attributes which tag records as members of a part or relationship transition set are lacking, structure changes are difficult to find. Once found the linkage between a structure change and component demand is more often than not obscured by multiple layers in the supply chain structure. There is no systematic and comprehensive process for validation of structure driven run to run variations in requirements. State of the art demand validation entails a labor intensive inconsistent hit and miss manual query based process which frequently overlooks major structure driven impacts. Since erroneous structure driven impacts translate directly to negative serviceability, productivity, and inventory impacts, the business impact of structure changes can be significant.

A system, method and techniques may be provided that systematically and comprehensively identify and evaluate structure changes in MRP runs, which includes a multi-step process employing a focused crawler analytic to: transform dated structure inputs to time based patterns which represent effectivity windows within the plan horizon for child parts on BOM or interplant records; employ a multi-stage multi dimensional recursive optimizing pattern matcher method to associate effectivity window patterns, first within the current cycle MRP input space, then across a sequential series of MRP cycles, and across like business entities, into transition sets which most likely represent shifts in BOM content and/or interplant relationships; tie changes to top level demand drivers and effected component items; rationalize in and cross cycle, cross location, structure differences with trends in component and driver demand to identify candidate soft spots in part and/or relationship changes which can negatively impact the exploded demand result; distill the analysis down to a consumable view which visually renders the problem and impact.

Figure 1:
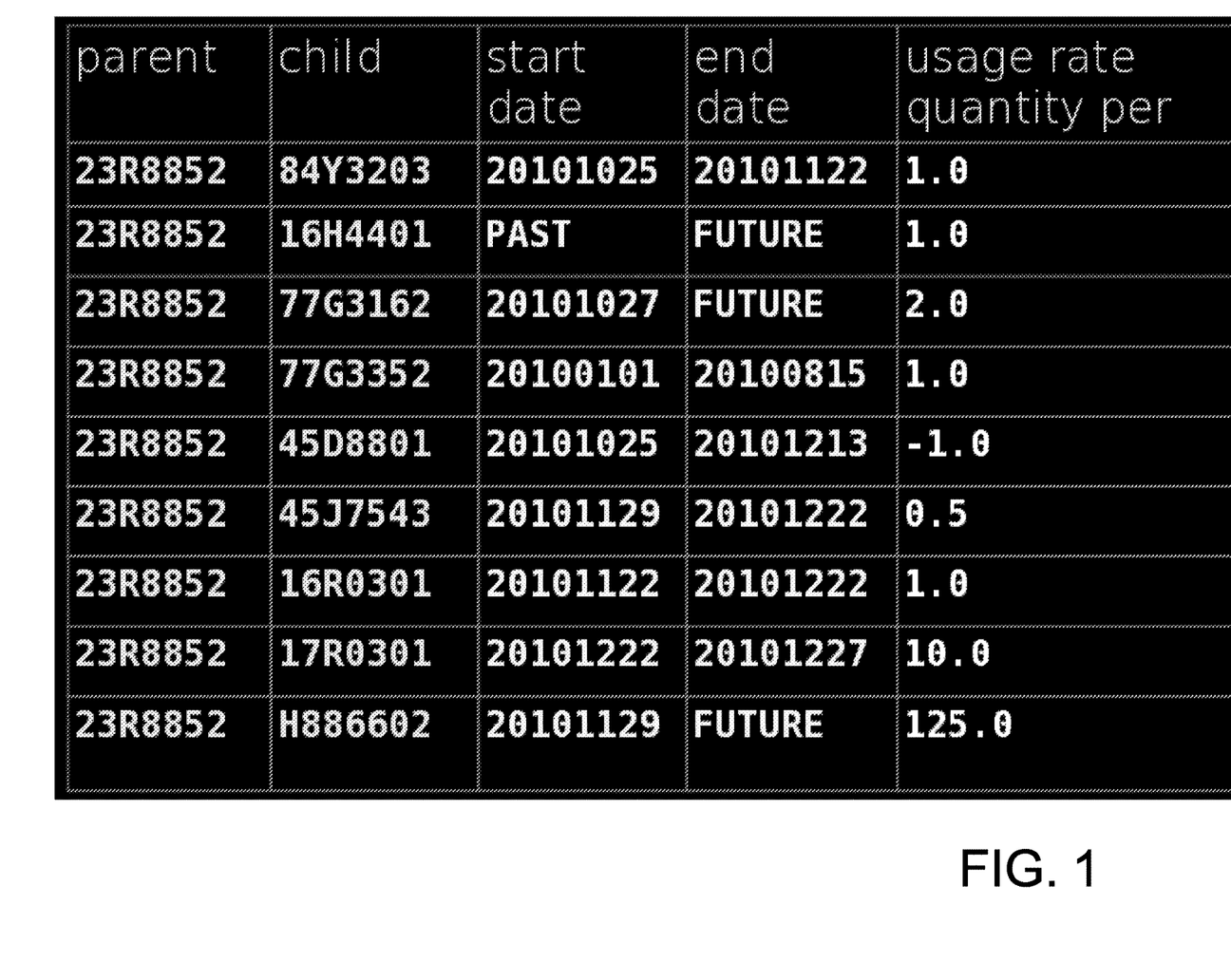
FIG. 1 shows a sample BOM input for a hypothetical assembly product in one embodiment.

FIG. 1 shows a sample BOM input for a hypothetical assembly, for example, hypothetical product code, 23R8852. For each component part in the assembly there is a date pair specified which determines the window of time within which the child component can be used on the assembly. Some components are effective throughout the plan horizon, but some components are effective for only a portion of the plan horizon. For components in the latter category, there is assumed to be some sort of Engineering Change (EC) directive which is requesting a transition from one component to another (ECX), a new part in (NPI) condition, and/or and end of life (EOL) condition.

The nature of the BOM input is such that it is not obvious through casual visual inspection if there are any ECX, NPI, and/or EOL components on the BOM. It is even less obvious for ECX type components that tells which component represents the outbound side of a component transition, and which component represents the new inbound side of a component transition.

Figure 2:
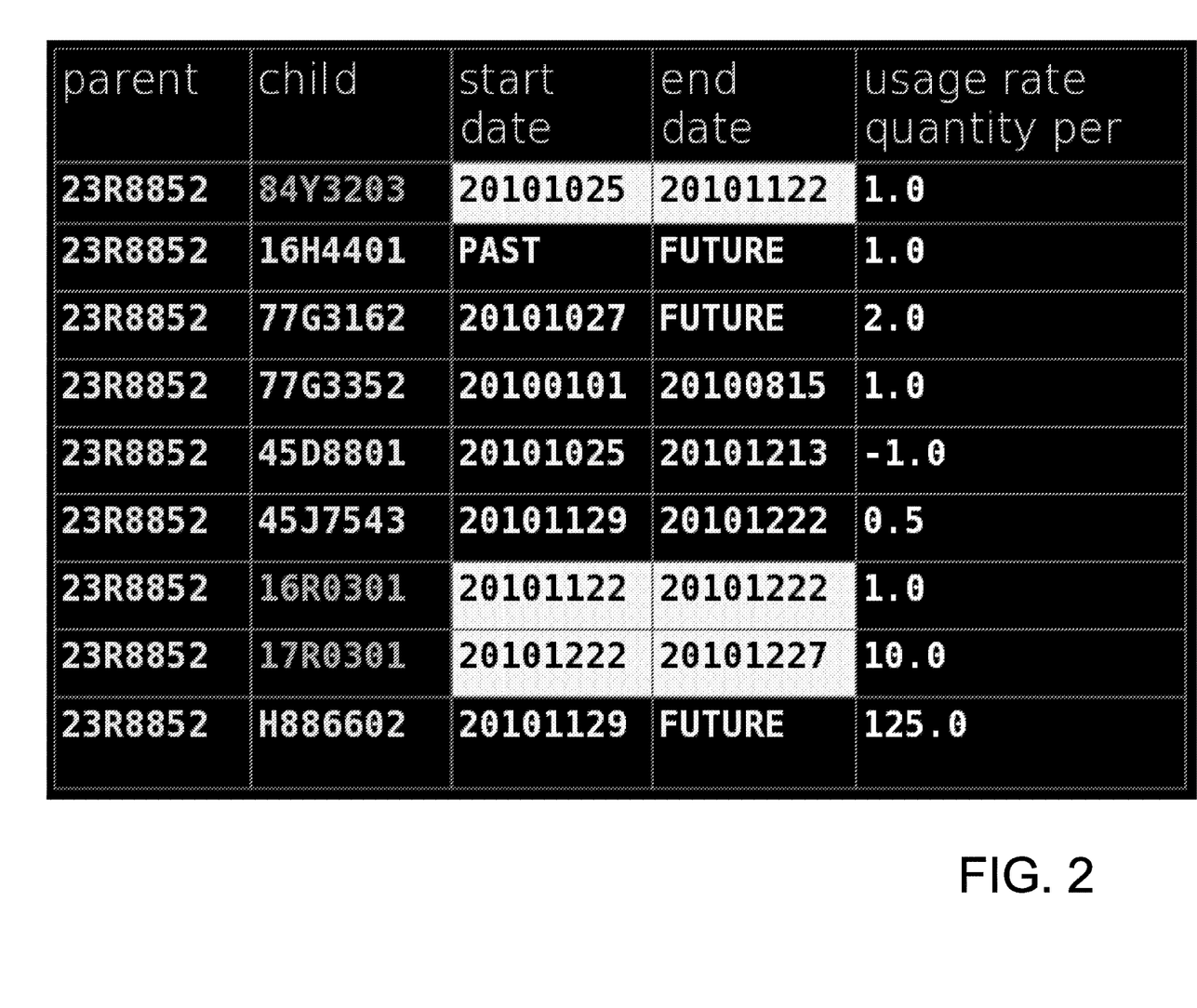
FIG. 2 represents an example of the 2-stage engineering change (EC) in one embodiment.

With proper highlighting, engineering changes are rendered visible. FIG. 2 represents an example of the 2-stage EC, where child 84Y3203 shifts to child 16R0301 then to 17R0301. The highlighted components constitute a transition set, that is, a group of child parts governed by an EC directive. There can be zero, one, or N>1 transition sets on an individual BOM.

If effectivity dates are transformed to a simple binary pattern—where a bit represents a week, a one represents an Active component, and a zero represents an Inactive component, then transition set members seem obvious and the behavior of the EC over the life of the plan horizon is made clear.

Figure 3:
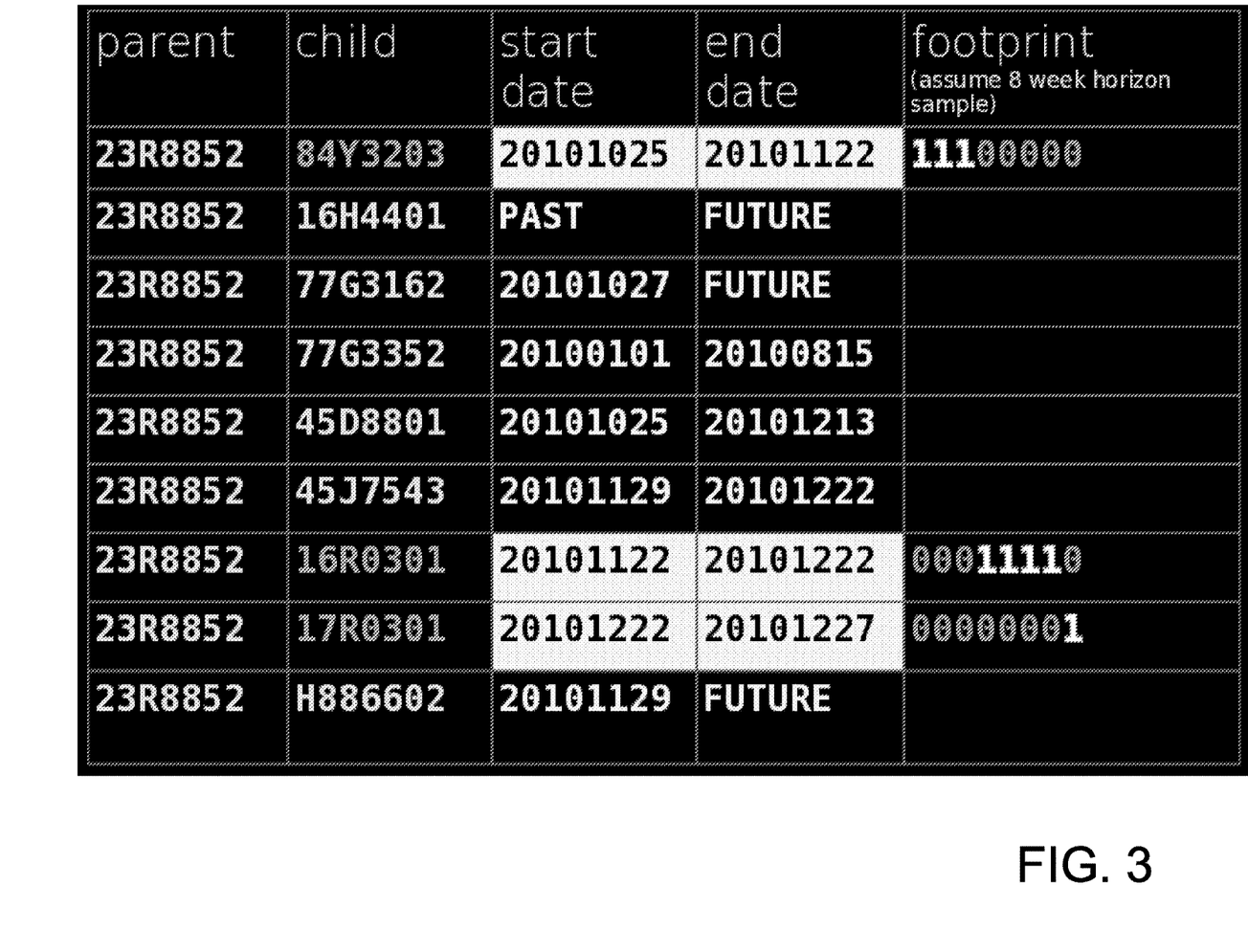
FIG. 3 shows an example illustrating a binary pattern transformation in one embodiment.

FIG. 3 shows an example illustrating such binary pattern transformation in one embodiment. In the example shown in FIG. 3, 84Y3203 is active for the 1st three weeks, then 16R0301 is effective for the next four weeks, while 17R0301 takes over for the last week in the eight week plan horizon. It would seem that simple date to bit string transform solves the problem of identifying EC activity in BOM structures. However, that is not the case.

Figure 4:
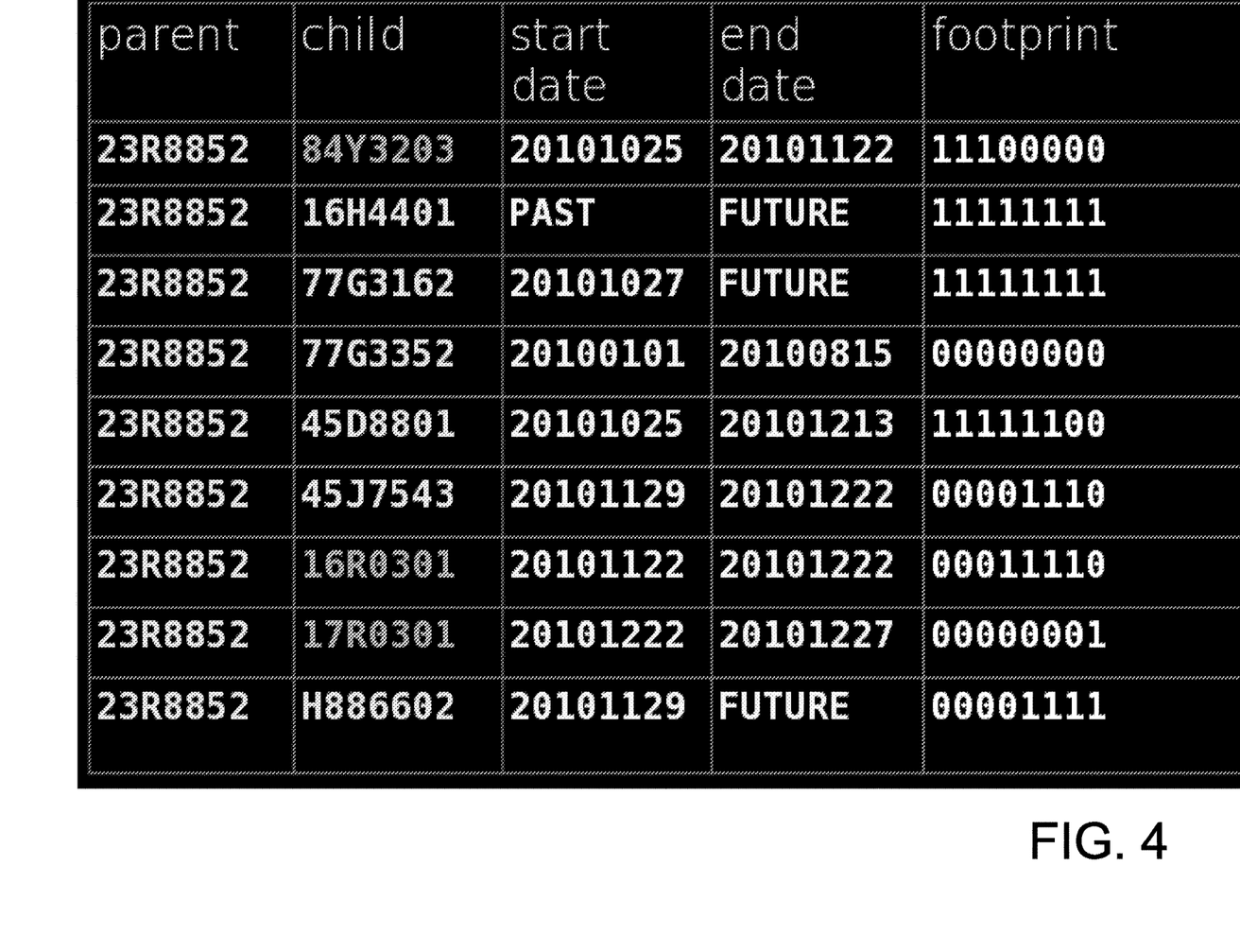
FIG. 4 shows another example of a binary pattern transformation in one embodiment.

If there is only one EC Set on a BOM then the structure shown in FIG. 3 may work. If, however, as in FIG. 4, there is a mix of one or more ECX, NPI, and/or EOL conditions on a BOM then the bit string transform does not make the identification of changes sets any easier. In FIG. 4, the bit string transforms provide, for a given child part, a good visual for effectivity over the horizon, but provide no relief for the problem of identifying EC Sets, that is, groups of child parts that are governed by a specific EC directive. Without a clear view of transition set members, behavior of EC's, if any, is obscure.

Figure 5:
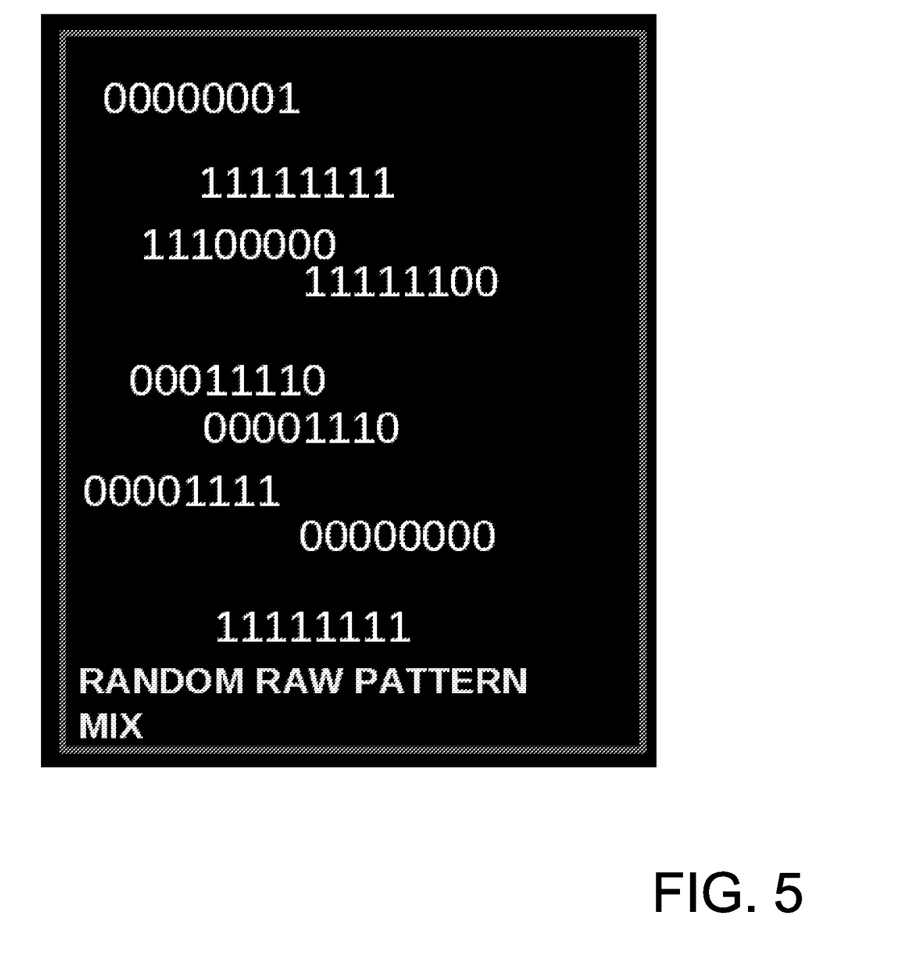
FIG. 5 shows an example of a stand-alone set of bit strings in one embodiment.

If the bit string transforms are separated from the raw input record, e.g., "<parent><child><start_date><end_date><quantity_per>", and view them as a "stand-alone" set of bit strings, they appear in FIG. 5 as a seemingly unrelated and somewhat random set of bit strings.

The crux of the above described identification (ID) problem is the ability to "optimally join" the random bit string transforms which allows the results to be characterized as good/bad EC's, business as usual (BAU), NPI, EOL, or transient.

Figure 6:
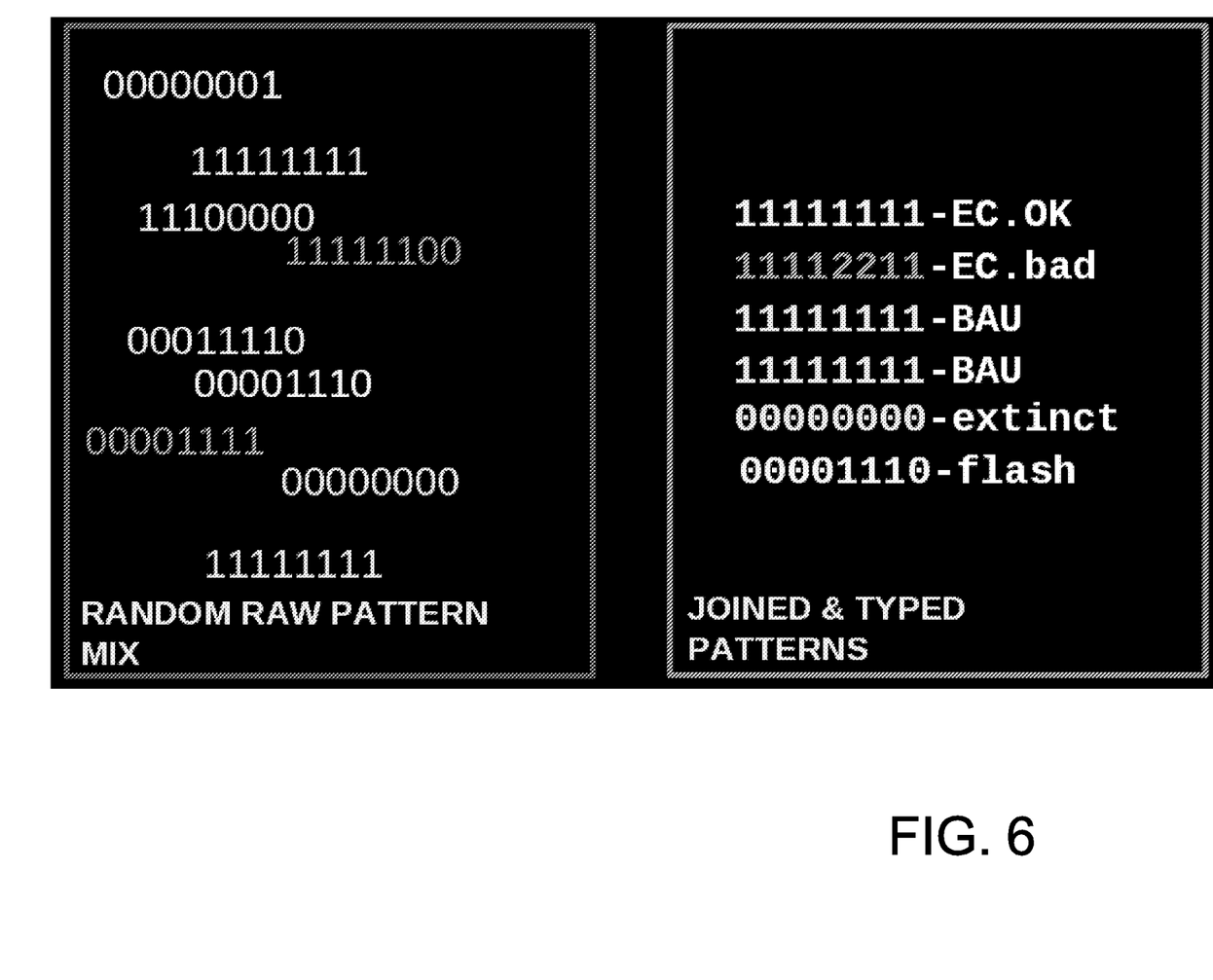
FIG. 6 shows another example of random pattern set resulting in possible joined and type patterns in one embodiment.

Referring to FIG. 6, for the pattern set on the left there are several possible joins, where a join will equate with an EC transition set. Since there are no explicit attributes in the BOM data which tie child parts to a specific EC directive, it is not possible to definitively say a particular join accurately associates with an EC. In practice, however it is possible to identify best fit or optimal joins. For a single set of input patterns shown in FIG. 6, while a human reader may fairly easily discern an "optimal join", it is difficult for a machine to do this. In one embodiment of a method and system in the present disclosure, a multi stage recursive algorithm is provided which automates the discovery of best fit joins for patterns on a specific BOM within a specific MRP base. Optimal joins, which when fed to a down-stream multi-dimensional rationalization step, provide insight into EC behavior and impact, insight which a machine would not normally be able to discern, and therefore, remain obscure to the machine.

Analysis Process Overview

Figure 7:
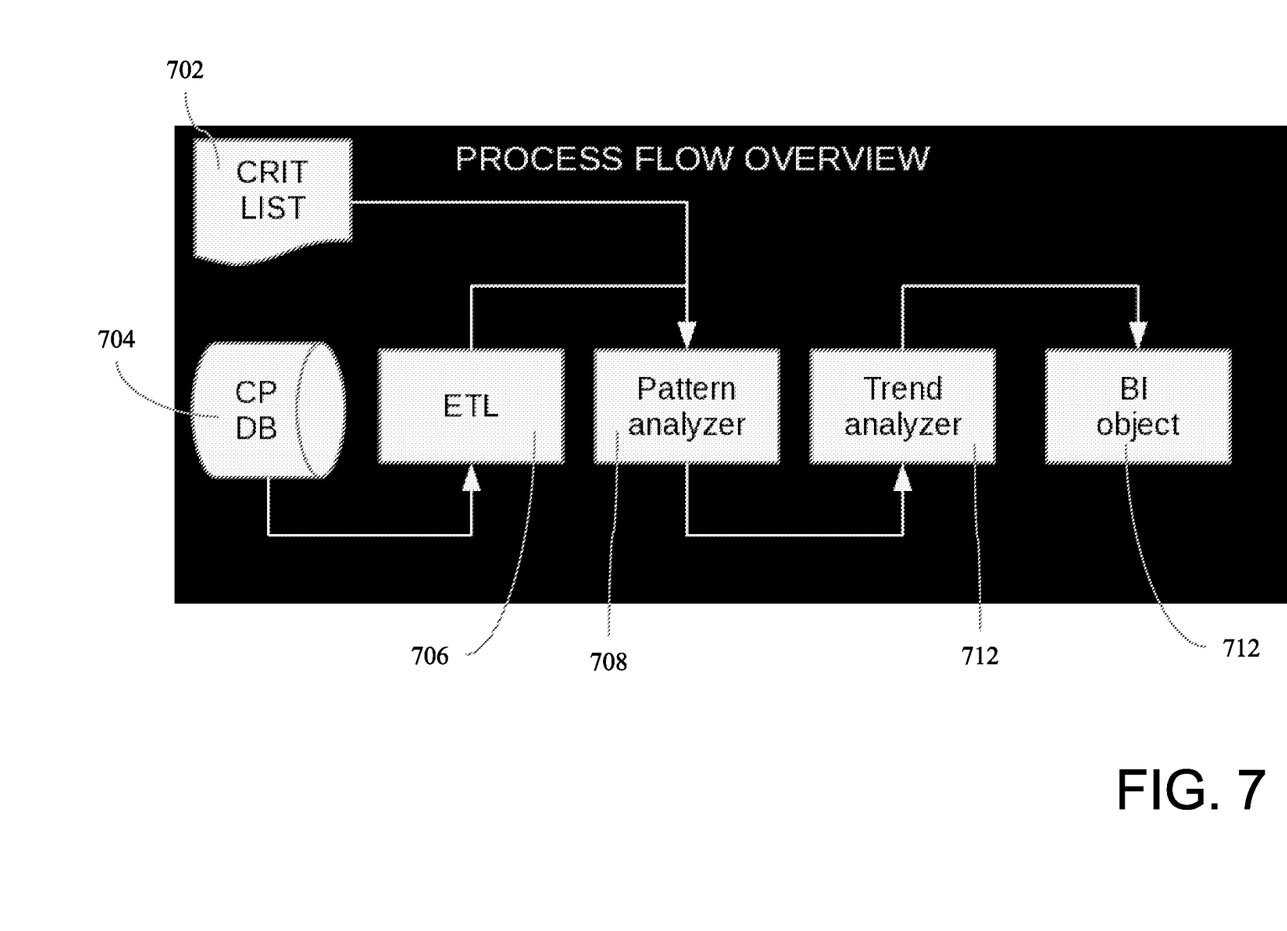
FIG. 7 is a flow diagram illustrating a multi step process that provides for effective identification and analysis of EC activity within and across material requirements planning (MRP) runs.

FIG. 7 is a flow diagram illustrating a multi step process that provides for effective identification and analysis of EC activity within and across MRP runs. The functional components shown in FIG. 7 in one embodiment executes on at least one hardware processor, which may be coupled with a storage or memory device. In one embodiment, the process is driven by a Critical Parts List 702 which corresponds to a set of "high stakes" items in the MRP result set, items for which a quality exploded demand result is required to ensure bottom line demand serviceability and minimal excess inventory. Critical Parts List 702 may be represented in a data structure that may include attributes such as component or part names, current inventory information, lead time for obtaining those parts, and cost of the parts or components. A manufacturing system may store this type of information.

An extract, transform and load (ETL) stage 706 pulls all structure and demand information from the MRP database (e.g., consolidated product database (CPDB)) 704 that employs markup logic to identify all BOM's, interplants, and driver demands that influence the value of the exploded component demand of the critical part. ETL is a process in data warehousing.

The universe of MRP items (identified at 706) which influence the critical parts exploded demand result is fed to a pattern analyzer 708.

The pattern analyzer 708 looks for structure changes which occur within a specific MRP base. Several MRP bases are so analyzed, and the pattern analyzer result sets are fed to a trend analyzer 710.

The trend analyzer 710 looks for structure changes which occur across bases, along with shifts in driver and component demand. For each structure item (e.g., BOM for a product) analyzed, a business intelligence object 712 is produced. The business intelligence object 712 provides a clear view of structure item behavior within and across bases rationalized versus trends in driver and exploded component demand, impact of which is quantified by a key performance indicator (KPI). For example, trends may indicate that a first component of BOM is being utilized more or less across assembly of a group of products.

Pattern Analyzer Step

Figure 8:
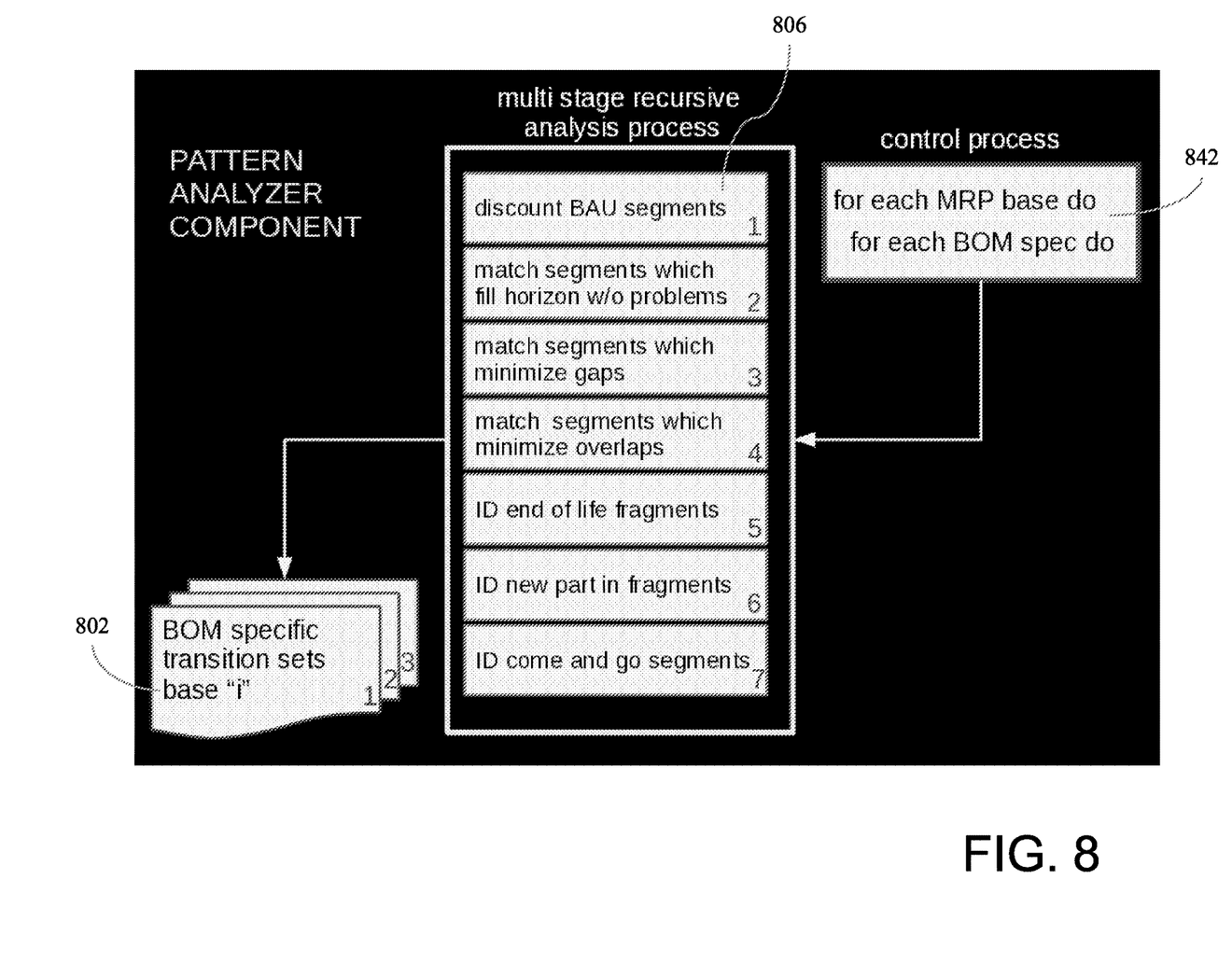
FIG. 8 is a diagram illustrating a method of a pattern analyzer component in one embodiment.

FIG. 8 is a diagram illustrating a method of a pattern analyzer component in one embodiment. The pattern analyzer component in one embodiment runs or executes on at least one hardware processor, which may be coupled with a memory device and/or a storage device. In one embodiment, the pattern analyzer component (e.g., FIG. 7 708) employs a seven stage recursive optimal pattern matching process to identify transition sets on structure items. The sets include child components on a BOM structure whose effectivity is likely governed by an engineering change directive. The analyzer is brought to bear on a sequential series of MRP result sets to produce a sequenced series of BOM specific in base transition sets 802. While effective analysis may require the identification of in base transition sets, in base analysis may not be sufficient. This is because some structure changes are visible within a specific base, but other structure changes are visible only when looking across multiple MRP bases. For this reason, the results out of the pattern analyzer component are fed to a downstream process step which provides cross base analysis of the BOM structures, interplant relationships, and both driver and component demands.

A seven stage recursive optimal pattern matching process in one embodiment includes performing the following steps for each BOM specification in each MRP base: discount business as usual (BAU) segments; match segments which fill horizon without problems; match segments which minimize gaps; match segments which minimize overlaps; identify end of life fragments; identify new part in fragments; and identify come and go segments. Referring to FIG. 8, a control process performs for each BOM specification in each MRP base as shown at 804, the multi-stage recursive analysis process comprising the above steps as shown at 806. This analysis, for example, is performed based on different business segments such as high-end product segment, near-to-end-of-life product segment, commodity product segment, and/or others.

Trend Analysis Component

Figure 9:
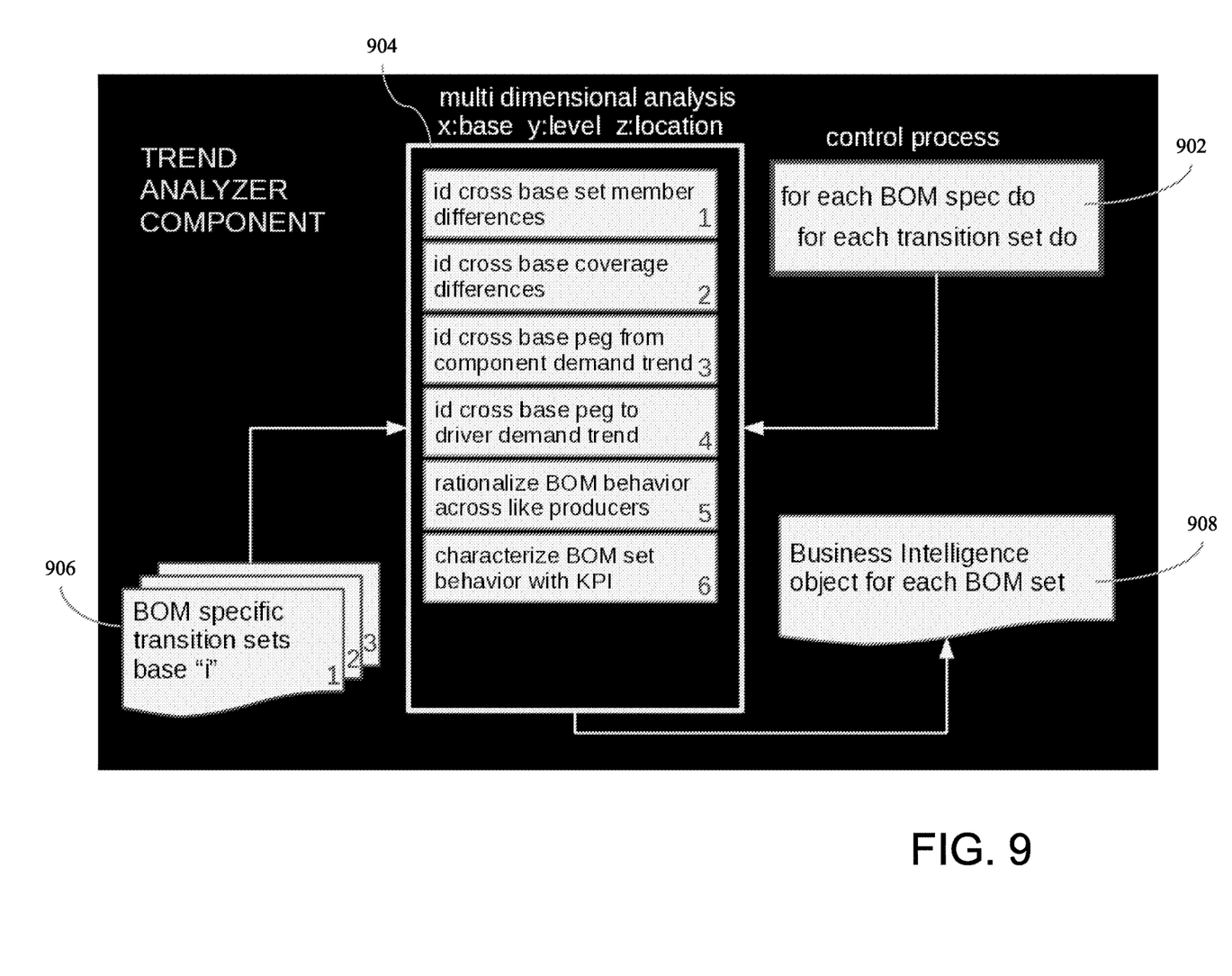
FIG. 9 is a diagram illustrating a method of trend analysis component in one embodiment.

Trend analysis operates an the MRP base sequenced result sets (e.g., FIG. 8 802) produced by the pattern analyzer process component to develop a comprehensive in base and cross base view of structure change, rationalized against driver and component demands, distilled down to consumable focused business intelligence objects. FIG. 9 is a diagram illustrating a method of trend analysis component in one embodiment. The trend analysis component in one embodiment runs or executes on at least one hardware processor, which may be coupled with a memory device and/or a storage device. The KPI developed for each transition set weighs a combination of factors: consistency of the effectivity patterns across locations and bases; consistency of the child members across locations and bases; gaps and/or overlaps in effectivity patterns versus exploded component demand trend; gaps and/or overlaps in set members versus exploded component demand trend; new part in/end of life activity inconsistent with exploded component demand trend to gauge the likelihood that a given transition set could negatively impact driver demand serviceability and/or excess inventory levels.

Referring to FIG. 9, a control process 902 performs the analysis shown at 904 for each transition set in each BOM specification 906, and produces a business intelligent object for each BOM set 908. The multi-dimensional analysis at 904 in one embodiment includes: identifying cross base set member differences; identifying cross base coverage differences; identifying cross base peg from component demand trend; identifying cross base peg from driver demand trend; rationalizing BOM behavior across like producers; and characterizing BOM set behavior with KPI.

Figure 10:
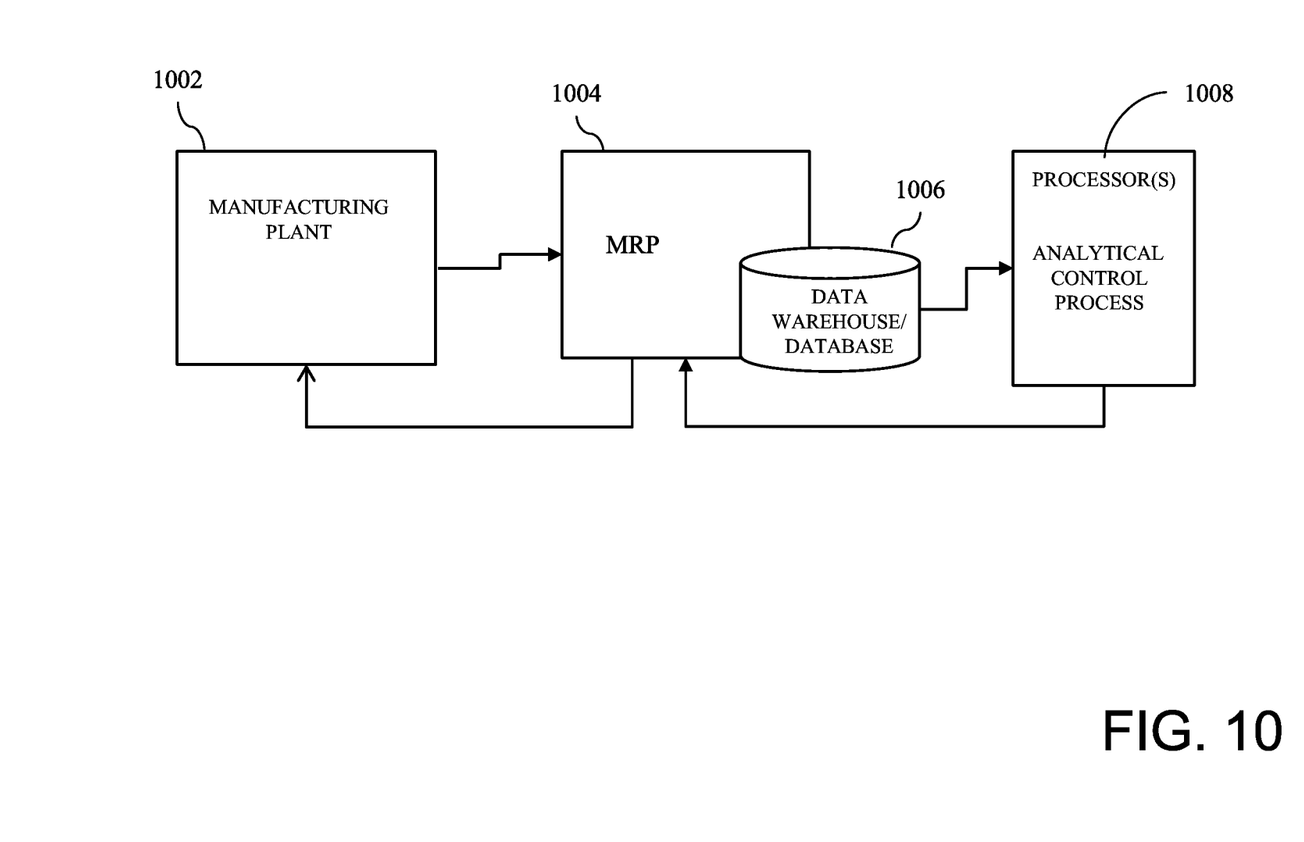
FIG. 10 is a diagram illustrating an overview of a system in one embodiment of the present disclosure.

FIG. 10 is a diagram illustrating an overview of a system in one embodiment of the present disclosure. A manufacturing plant 1002 such as electronic goods manufacturing plant or another discrete type of manufacturing plant may utilize an MRP system 1004 in its manufacturing process. An MRP system 1004, for example, may be a component of enterprise resource planning (ERP) system, and may include a database system or a data warehouse 1006, which stores MRP base data and BOM data. The MRP system 1004 executes on one or more hardware processors, and the data of the database system or data warehouse 1006 are stored on one or more storage devices. One or more hardware processors or computers 1008 may perform the processes described above, for example, described with reference to FIG. 7, FIG. 8 and FIG. 9. The control process performed at 1008 may generate business intelligent components, which are fed back into the MRP system 1004 to control the MRP, which in turn controls or adjusts the actual manufacturing process at the manufacture plant 1002.

In one aspect, the output business intelligent component that are fed into the MRP system 1004 may cause the manufacturing plant 1002 to change its policies in manufacturing, e.g., change or adjust its safety stock level, change or adjust the volume of manufacturing of one or more products.

Figure 11:
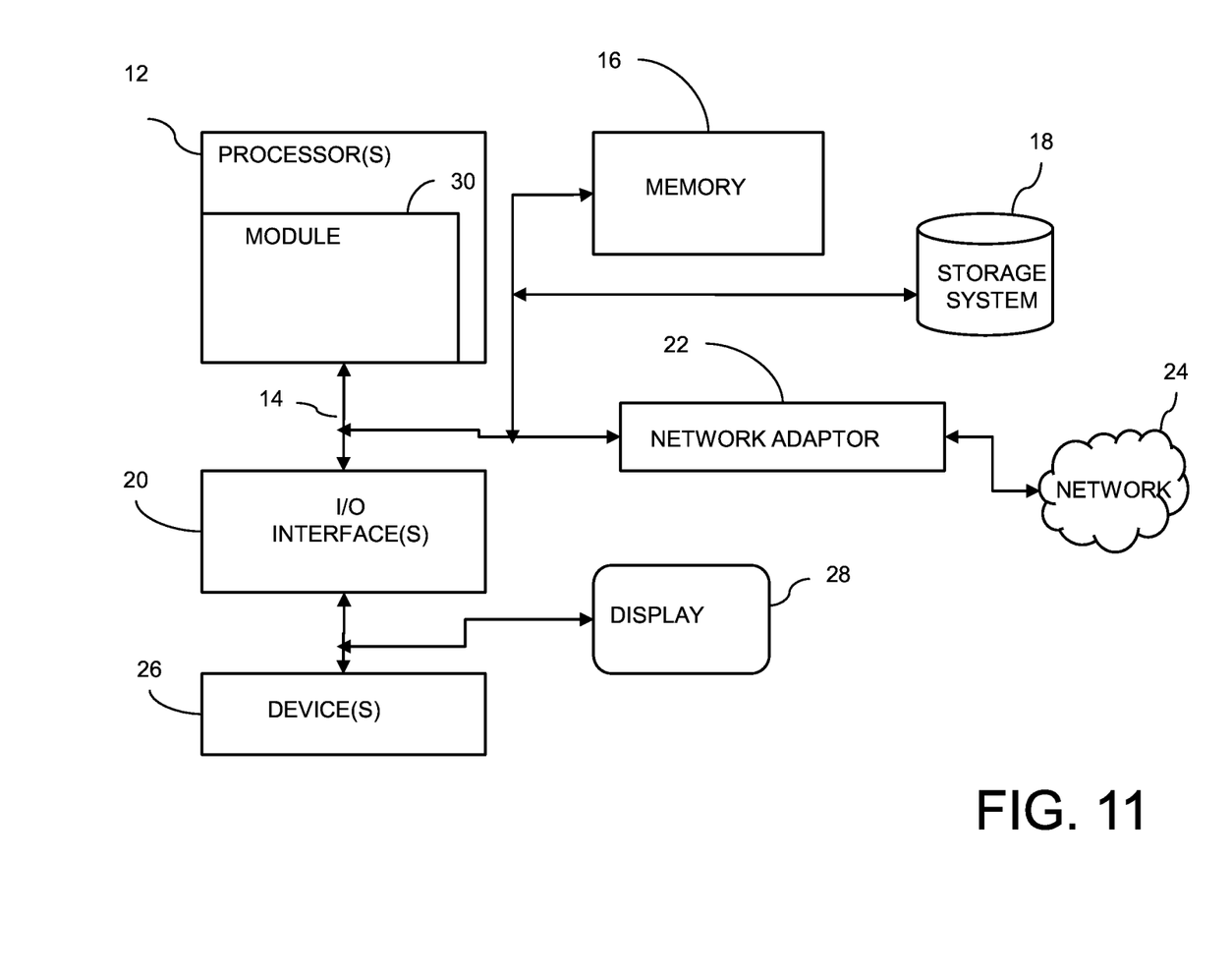
FIG. 11 illustrates a schematic of an example computer or processing system that may implement a system in one embodiment of the present disclosure.

FIG. 11 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of transforming supply chain data structures, the method executed by at least one hardware processor, the method comprising:
  receiving a parts list comprising a list of components used in manufacturing products;

extracting, transforming and loading data structure and demand information associated with the list of components from a product database;

feeding the parts list and the data structure and demand information to a pattern analyzer executing on a hardware processor;

the pattern analyzer detecting structure changes occurring within a manufacturing requirements planning base for multiple manufacturing requirements planning bases;

feeding the detected structure changes to a trend analyzer executing on the hardware processor;

the trend analyzer detecting structure changes occurring across the multiple manufacturing requirements planning bases, wherein the trend analyzer automatically detects structure changes in the manufacturing products which are not visible within a specific manufacturing requirements planning base;

the trend analyzer generating a business intelligence object providing a view of structure item behavior within and across the multiple manufacturing requirements planning bases; and based on the business intelligence object, controlling a manufacturing process to adjust a volume of manufacturing of the manufacturing products.

2. The method of claim 1, wherein the parts list is produced by running a manufacturing requirements planning (MRP) process.

3. The method of claim 1, wherein the trend analyzer further detects shifts in driver and component demand along with the structure changes occurring across the multiple manufacturing requirements planning bases.

4. The method of claim 1, wherein an impact of the business intelligence object is quantified by a key performance indicator.

5. The method of claim 1, wherein the pattern analyzer detecting structure changes comprises:
discounting business as usual segments;
matching segments which fill horizon without problems;
matching segments which minimize gaps;
matching segments which minimize overlaps;
identifying end of life fragments;
identifying new part in fragments; and
identifying new come and go segments.

6. The method of claim 5, wherein the discounting, the matching steps, the identifying steps are executed for each bill of material (BOM) found in each of the multiple manufacturing requirements planning bases, wherein the pattern analyzer produces a manufacturing requirements planning (MRP) base sequenced result sets.

7. The method of claim 6, wherein the trend analyzer detecting structure changes occurring across the multiple manufacturing requirements planning bases comprises:
identifying cross base set member differences;
identifying cross base coverage differences;
identifying cross base peg from component demand trend;
identifying cross base peg from driver demand trend;
rationalizing BOM behavior across like producers; and
characterizing BOM set behavior with key performance indicator (KPI).

8. A computer program product comprising a computer readable storage medium having program instructions embodied therewith, the program instructions readable by a device to cause the device to
receive a parts list comprising a list of components used in manufacturing products;
extract, transform and load data structure and demand information associated with the list of components from a product database;
feed the parts list and the data structure and demand information to a pattern analyzer executing on a hardware processor;
the pattern analyzer detecting structure changes occurring within a manufacturing requirements planning base for multiple manufacturing requirements planning bases;
feed the detected structure changes to a trend analyzer executing on the hardware processor;
the trend analyzer detecting structure changes occurring across the multiple manufacturing requirements planning bases;
the trend analyzer generating a business intelligence object providing a view of structure item behavior within and across the multiple manufacturing requirements planning bases wherein the trend analyzer automatically detects structure changes in the manufacturing products which are not visible within a specific manufacturing requirements planning base; and
based on the business intelligence object, control a manufacturing process to adjust a volume of manufacturing of the manufacturing products.

9. The computer program product of claim 8, wherein the parts list is produced by running a manufacturing requirements planning (MRP) process.

10. The computer program product of claim 8, wherein the trend analyzer further detects shifts in driver and component demand along with the structure changes occurring across the multiple manufacturing requirements planning bases.

11. The computer program product of claim 8, wherein an impact of the business intelligence object is quantified by a key performance indicator.

12. The computer program product of claim 8, wherein the pattern analyzer detecting structure changes comprises:
discounting business as usual segments;
matching segments which fill horizon without problems;
matching segments which minimize gaps;
matching segments which minimize overlaps;
identifying end of life fragments;
identifying new part in fragments; and
identifying new come and go segments.

13. The computer program product of claim 12, wherein the discounting, the matching steps, the identifying steps are executed for each bill of material (BOM) found in each of the multiple manufacturing requirements planning bases, wherein the pattern analyzer produces a manufacturing requirements planning (MRP) base sequenced result sets.

14. The computer program product of claim 13, wherein the trend analyzer detecting structure changes occurring across the multiple manufacturing requirements planning bases comprises:
identifying cross base set member differences;
identifying cross base coverage differences;
identifying cross base peg from component demand trend;
identifying cross base peg from driver demand trend;
rationalizing BOM behavior across like producers; and
characterizing BOM set behavior with key performance indicator (KPI).

15. A system comprising:
a hardware processor;
a memory device coupled to the hardware processor;
the hardware processor configured to perform:
receiving a parts list comprising a list of components used in manufacturing products;

extracting, transforming and loading data structure and demand information associated with the list of components from a product database;

feeding the parts list and the data structure and demand information to a pattern analyzer executing on a hardware processor;

the pattern analyzer detecting structure changes occurring within a manufacturing requirements planning base for multiple manufacturing requirements planning bases;

feeding the detected structure changes to a trend analyzer executing on the hardware processor;

the trend analyzer detecting structure changes occurring across the multiple manufacturing requirements planning bases, wherein the trend analyzer automatically detects structure changes in the manufacturing products which are not visible within a specific manufacturing requirements planning base;

the trend analyzer generating a business intelligence object providing a view of structure item behavior within and across the multiple manufacturing requirements planning bases; and based on the business intelligence object, controlling a manufacturing process to adjust a volume of manufacturing of the manufacturing products.

16. The system of claim 15, wherein the parts list is produced by running a manufacturing requirements planning (MRP) process.

17. The system of claim 15, wherein the trend analyzer further detects shifts in driver and component demand along with the structure changes occurring across the multiple manufacturing requirements planning bases.

18. The system of claim 15, wherein an impact of the business intelligence object is quantified by a key performance indicator.

19. The system of claim 15, wherein the pattern analyzer detecting structure changes comprises:
 discounting business as usual segments;
 matching segments which fill horizon without problems;
 matching segments which minimize gaps;
 matching segments which minimize overlaps;
 identifying end of life fragments;
 identifying new part in fragments; and
 identifying new come and go segments.

20. The system of claim 19, wherein the trend analyzer detecting structure changes occurring across the multiple manufacturing requirements planning bases comprises:
 identifying cross base set member differences;
 identifying cross base coverage differences;
 identifying cross base peg from component demand trend;
 identifying cross base peg from driver demand trend;
 rationalizing bill of material (BOM) behavior across like producers; and
 characterizing BOM set behavior with key performance indicator (KPI).

* * * * *